United States Patent
Iwai et al.

(10) Patent No.: US 12,365,334 B2
(45) Date of Patent: Jul. 22, 2025

(54) MOBILE BODY CONTROL METHOD, MOBILE BODY CONTROL SYSTEM, AND STORAGE MEDIUM

(71) Applicants: TOYOTA JIDOSHA KABUSHIKI KAISHA, Aichi-ken (JP); National University Corporation Tokyo University of Agriculture and Technology, Tokyo (JP)

(72) Inventors: Hidenari Iwai, Susono (JP); Shintaro Inoue, Kanagawa-ken (JP); Pongsathorn Raksincharoensak, Fuchu (JP)

(73) Assignees: TOYOTA JIDOSHA KABUSHIKI KAISHA, Aichi-Ken (JP); NATIONAL UNIVERSITY ORPORATION TOKYO UNIVERSITY OF AGRICULTURE AND TECHNOLOGY, Tokyo (JP)

( * ) Notice: Subject to any disclaimer, the term of this patent is extended or adjusted under 35 U.S.C. 154(b) by 349 days.

(21) Appl. No.: 18/151,474

(22) Filed: Jan. 9, 2023

(65) Prior Publication Data
US 2023/0219567 A1 Jul. 13, 2023

(30) Foreign Application Priority Data
Jan. 11, 2022 (JP) ................. 2022-002462

(51) Int. Cl.
*B60W 30/09* (2012.01)
(52) U.S. Cl.
CPC ........ *B60W 30/09* (2013.01); *B60W 2520/14* (2013.01); *B60W 2556/40* (2020.02)
(58) Field of Classification Search
CPC ............. B60W 30/09; B60W 2520/14; B60W 2556/40; B60W 60/0011
See application file for complete search history.

(56) References Cited

U.S. PATENT DOCUMENTS

2015/0334269 A1* 11/2015 Yokota ................. H04N 23/60
  382/103
2016/0221549 A1* 8/2016 Tanase ..................... B60T 7/22
(Continued)

FOREIGN PATENT DOCUMENTS

CN 111596668 B * 12/2021 .......... G05D 1/0214
CN 113879291 A * 1/2022
WO WO-9109375 A1 * 6/1991

OTHER PUBLICATIONS

Machine translation of CN111596668 (Year: 2021).*
(Continued)

*Primary Examiner* — Anne Marie Antonucci
*Assistant Examiner* — Patrick Daniel Mohl
(74) *Attorney, Agent, or Firm* — HAUPTMAN HAM, LLP

(57) ABSTRACT

Based on a recognition result of a recognition sensor installed in a mobile body, a mobile body control system calculates a first target path for moving to a destination while avoiding a risk around the mobile body. Further, based on the first target path, the mobile body control system calculates a second target path having higher granularity than the first target path. Then, the mobile body control system controls the mobile body so as to follow the second target path. The mobile body control system determines in which field the mobile body moves, a normal field or a specific field having more risks than the normal field. When the mobile body moves in the specific field, the mobile body control system reduces a frequency of update of the first target path compared with that when the mobile body moves in the normal field.

13 Claims, 16 Drawing Sheets

(56) References Cited

U.S. PATENT DOCUMENTS

| | | | | |
|---|---|---|---|---|
| 2017/0015315 A1* | 1/2017 | Hattori | ............... | G05D 1/0055 |
| 2018/0346027 A1* | 12/2018 | Fujii | .................. | B62D 15/025 |
| 2019/0071073 A1* | 3/2019 | Yamashita | ............ | B60W 30/12 |
| 2020/0070818 A1* | 3/2020 | Tominaga | ............. | B60W 10/20 |
| 2020/0139965 A1* | 5/2020 | Hanna | .............. | B60W 30/0956 |
| 2021/0114629 A1* | 4/2021 | Komuro | ........... | B60W 30/0956 |
| 2021/0284198 A1* | 9/2021 | Schmidt | .............. | G05D 1/0251 |
| 2021/0302982 A1* | 9/2021 | Yasui | .................. | B60W 30/09 |

OTHER PUBLICATIONS

Machine translation of CN113878291 (Year: 2022).*
Rohan Thakker, et al., "Autonomous Off-road Navigation Over Extreme Terrains With Perceptually-challenging Conditions," ArXiv: 2101.11110, dated Jan. 26, 2021; 12 pgs.

\* cited by examiner

| TYPE OF FIELD | NORMAL FIELD | SPECIFIC FIELD (OFF-ROAD) |
|---|---|---|
| CONTROL MODE | FIRST MODE (FLAT MODE) | SECOND MODE (OFF-ROAD MODE) |
| SUB-GLOBAL PATH UPDATE PERIOD | TS-1 | TS-2 (> TL-1) |
| LOCAL PATH UPDATE PERIOD | TL-1 | TL-2 (< TL-1) |

FIG. 16

| | DETERMINATION RESULT BASED ON MAP INFORMATION | FIELD DETERMINATION RESULT | | SELECTION MODE |
|---|---|---|---|---|
| | | DETERMINATION RESULT BASED ON SENSOR RECOGNITION RESULT | FINAL DETERMINATION | |
| ① | NORMAL FIELD | NORMAL FIELD | NORMAL FIELD | FIRST MODE (FLAT MODE) |
| ② | SPECIFIC FIELD | NORMAL FIELD | NORMAL FIELD | FIRST MODE (FLAT MODE) |
| ③ | SPECIFIC FIELD | SPECIFIC FIELD | SPECIFIC FIELD | SECOND MODE (OFF-ROAD MODE) |
| ④ | NORMAL FIELD | SPECIFIC FIELD | SPECIFIC FIELD | SECOND MODE (OFF-ROAD MODE) |

MOBILE BODY CONTROL METHOD, MOBILE BODY CONTROL SYSTEM, AND STORAGE MEDIUM

CROSS-REFERENCE TO RELATED APPLICATION

This application claims priority to Japanese Patent Application No. 2022-002462 filed on Jan. 11, 2022, incorporated herein by reference in its entirety.

BACKGROUND

1. Technical Field

This disclosure relates to a mobile body control method of controlling a mobile body, a mobile body control system, and a storage medium. In particular, this disclosure relates to a technique of controlling a mobile body so as to follow a target path.

2. Description of Related Art

Rohan Thakker, et al., "Autonomous Off-road Navigation over Extreme Terrains with Perceptually-challenging Conditions," arXiv:2101.11110, 26 Jan. 2021 discloses a technique for making a mobility travel autonomously on an uneven surface where there are rocks, steep slopes, cliffs, holes, etc. An autonomous travel system installed in the mobility determines a path plan in real time using recognition sensors and makes the mobility travel autonomously in accordance with the path plan. Path planners include three types: a long-range planner, a mid-range planner, and a short-range planner.

SUMMARY

Controlling a mobile body so as to follow a target path will be considered. In this case, it is conceivable to calculate a target path so as to avoid risks present around the mobile body, such as obstacles. However, when there are many risks around the mobile body, the calculated target path may hunt (oscillate). Hunting of the target path may cause problems such as a decrease in the stability of the mobile body.

This disclosure provides a technique that can reduce hunting of a target path when controlling a mobile body so as to follow the target path.

A first aspect of this disclosure is a mobile body control method of controlling a mobile body.

This mobile body control method includes:
based on a recognition result of a recognition sensor installed in a mobile body, calculating a first target path for moving to a destination while avoiding a risk around the mobile body;
based on the first target path, calculating a second target path having higher granularity than the first target path;
controlling the mobile body so as to follow the second target path;
determining in which field the mobile body moves, a normal field or a specific field having more risks than the normal field; and
reducing a frequency of update of the first target path in the specific field compared with that in the normal field.

A second aspect of this disclosure is a mobile body control system that controls a mobile body.

This mobile body control system includes one or more processors.

The one or more processors are configured to execute:
based on a recognition result of a recognition sensor installed in a mobile body, calculating a first target path for moving to a destination while avoiding a risk around the mobile body;
based on the first target path, calculating a second target path having higher granularity than the first target path;
controlling the mobile body so as to follow the second target path;
determining in which field the mobile body moves, a normal field or a specific field having more risks than the normal field; and
reducing a frequency of update of the first target path in the specific field compared with that in the normal field.

A third aspect of this disclosure is a non-transitory storage medium storing instructions that are executable by one or more processors and that cause the one or more processors to perform functions.

The functions include:
based on a recognition result of a recognition sensor installed in the mobile body, calculating a first target path for moving to a destination while avoiding a risk around the mobile body;
based on the first target path, calculating a second target path having higher granularity than the first target path;
controlling the mobile body so as to follow the second target path;
determining in which field the mobile body moves, a normal field or a specific field having more risks than the normal field; and
reducing a frequency of update of the first target path in the specific field compared with that in the normal field.

According to this disclosure, in the specific field where there are many risks, the frequency of update of the first target path calculated so as to avoid risks is reduced. Thus, hunting of the first target path at the time of update is reduced. As hunting of the first target path is reduced, the second target path calculated based on the first target path becomes stable. As a result, stability of the mobile body following the second target path is secured, and also straying of the mobile body is reduced. As straying of the mobile body is reduced, the moving time or fuel consumption is kept from increasing unnecessarily.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 16 is a conceptual view for describing examples of a field determination process according to the embodiment of this disclosure.

DETAILED DESCRIPTION OF EMBODIMENTS

An embodiment of this disclosure will be described with reference to the accompanying drawings.

1. Outline

A mobile body that can move autonomously will be considered. Examples of mobile bodies include vehicles, robots, and flying bodies. Examples of vehicles include self-driving vehicles and lunar surface exploration vehicles (lunar surface rovers). Examples of robots include logistic robots and working robots. Examples of flying bodies include planes and drones.

In the following description, a case where the mobile body is a vehicle will be considered as one example. For generalization, "vehicle" and "travel of the vehicle" in the following description will be replaced by "mobile body" and "movement of the mobile body," respectively.

Figure 1:
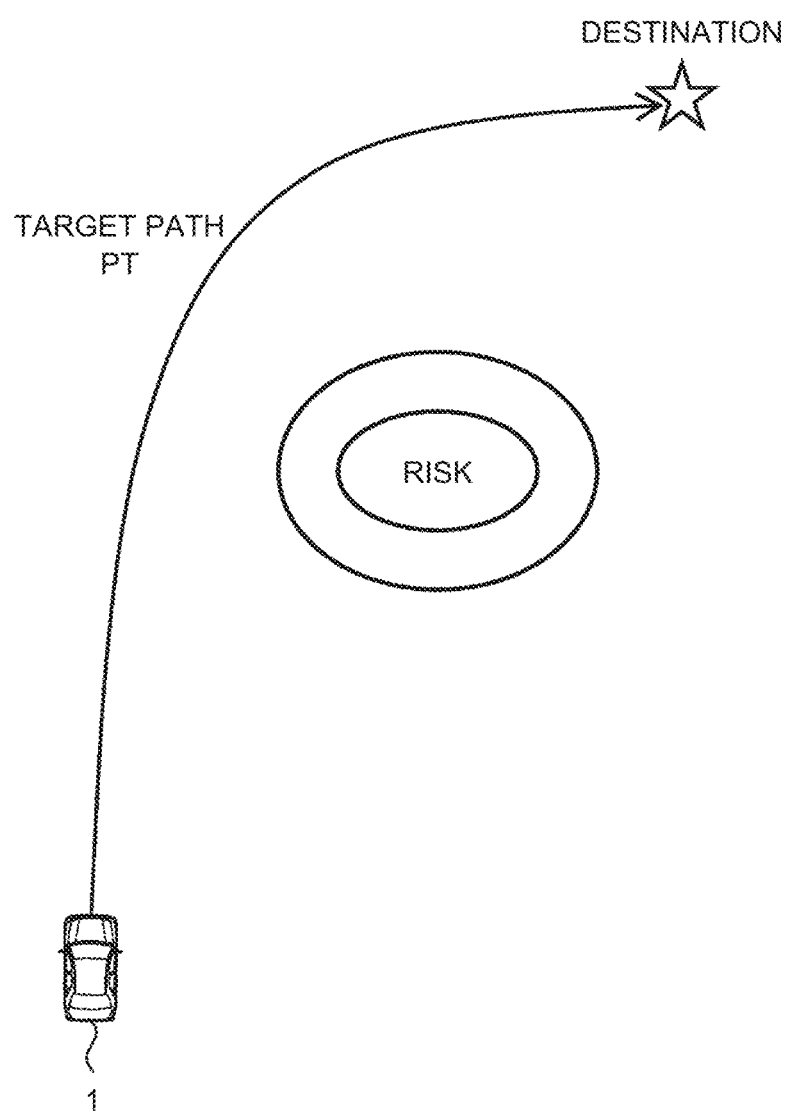
FIG. 1 is a conceptual view for describing an outline of vehicle control according to an embodiment of this disclosure.

FIG. 1 is a conceptual view for describing an outline of control of a vehicle 1 according to the embodiment. The vehicle 1 travels autonomously from a point of departure to a destination. More specifically, a target path PT for reaching the destination is calculated in real time, and the vehicle 1 is controlled so as to follow this target path PT. In this case, there may be risks around the vehicle 1 that hinder travel of the vehicle 1. For example, obstacles are risks that hinder travel of the vehicle 1. Such risks are recognized by recognition sensors installed in the vehicle 1. The target path PT is calculated so as to avoid the risks recognized by the recognition sensors.

In some cases, the vehicle 1 travels in an unknown environment. For example, the vehicle 1 may travel in a vast uneven surface or terrain. An uneven surface can also be called an off-road surface. There are no white lines in an unpaved uneven surface. In an uneven surface, there may instead be risks that hinder travel of the vehicle 1, such as rocks, trees, steep slopes, cliffs, hills, valleys, holes, depressions, and craters. In addition, shadows formed by light sources and landforms also reduce the recognition accuracy of recognition sensors and therefore constitute risks that hinder travel of the vehicle 1. When the mobile body is a flying body, a cave or the like corresponds to an uneven surface.

Further, an environment where a global navigation satellite system (GNSS) cannot be used is also conceivable. When making the vehicle 1 travel autonomously in such an environment, it is necessary to calculate the target path PT based on the recognition sensors installed in the vehicle 1.

This embodiment proposes a technique of calculating, in real time, a target path PT for moving to a destination while avoiding risks around the vehicle 1 by using the recognition sensors installed in the vehicle 1.

When there are many risks around the vehicle 1, the calculated target path PT may hunt (oscillate). Hunting of the target path PT is unfavorable as it causes a decrease in the stability of the vehicle 1, straying of the vehicle 1, etc. Therefore, this embodiment further proposes a technique that can reduce hunting of the target path PT.

2. Vehicle Control System 2-1. Example of Configuration

Figure 2:
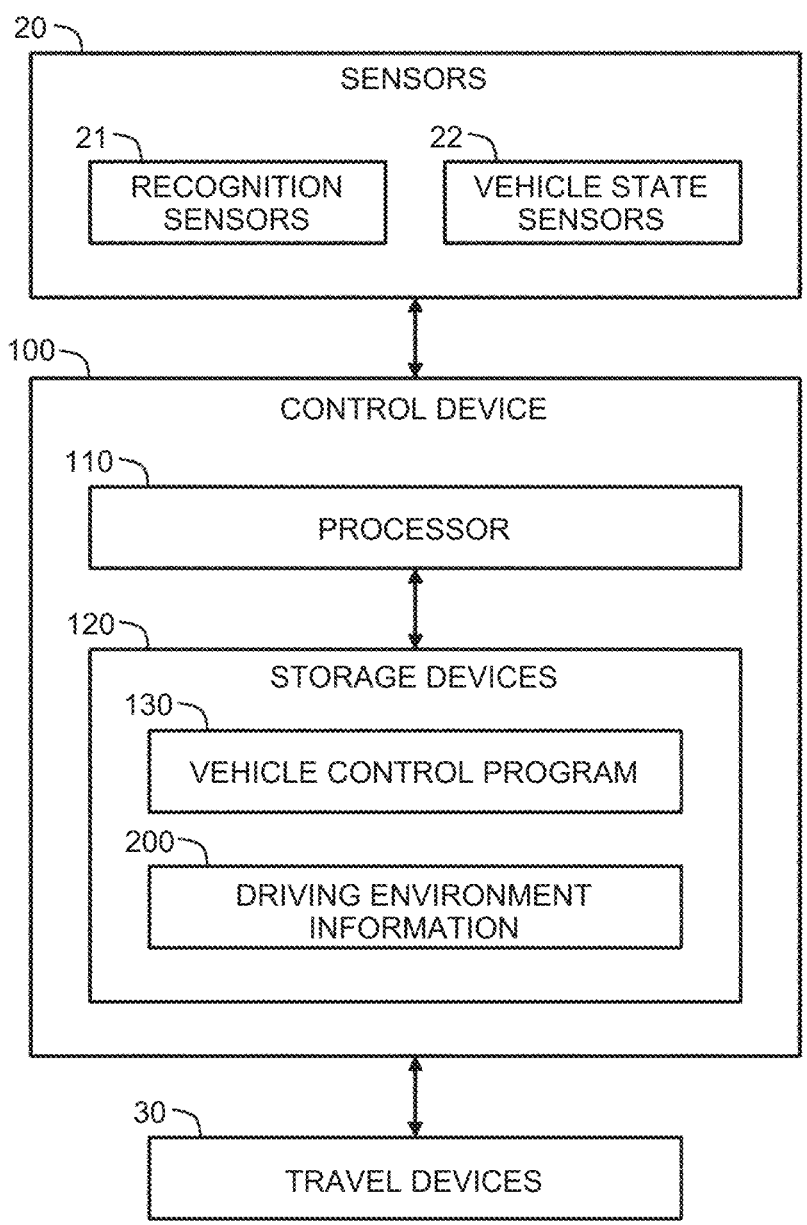
FIG. 2 is a block diagram showing an example of the configuration of a vehicle control system according to the embodiment of this disclosure.

FIG. 2 is a block diagram showing an example of the configuration of a vehicle control system 10 that controls the vehicle 1 according to the embodiment. Typically, the vehicle control system 10 is installed in the vehicle 1. The vehicle control system 10 includes sensors 20, travel devices 30, and a control device 100.

The sensors 20 are installed in the vehicle 1. The sensors 20 include recognition sensors (external sensors) 21 that recognize conditions around the vehicle 1. Examples of the recognition sensors 21 include a camera, a laser imaging detection and ranging (LIDAR), and a radar. The sensors 20 further include vehicle state sensors 22 that detect states of the vehicle 1. The vehicle state sensors 22 include a speed sensor, an acceleration sensor, a yaw rate sensor, a steering angle sensor, etc.

The travel devices 30 make the vehicle 1 travel. More specifically, the travel devices 30 include a steering device, a driving device, and a braking device. The steering device turns wheels of the vehicle 1. For example, the steering device includes an electric power steering (EPS) device. The driving device is a motive power source that generates a driving force. Examples of driving devices include an engine, an electric motor, and an in-wheel motor. The braking device generates a braking force. The travel devices 30 may make the vehicle 1 travel by a caterpillar.

The control device 100 is a computer that controls the vehicle 1. The control device 100 includes one or more processors 110 (hereinafter simply referred to as a processor 110) and one or more storage devices 120 (hereinafter simply referred to as a storage device 120). The processor 110 executes various processes. For example, the processor 110 includes a central processing unit (CPU). The storage device 120 stores various pieces of information needed for processing by the processor 110. Examples of the storage device 120 include a volatile memory, a non-volatile memory, a hard disk drive (HDD), and a solid state drive (SSD). The control device 100 may include one or more electronic control units (ECUs).

A vehicle control program 130 is a computer program that is executed by the processor 110. As the processor 110 executes the vehicle control program 130, functions of the control device 100 are realized. The vehicle control program 130 is stored in the storage device 120. Or the vehicle control program 130 may be recorded in a computer-readable recording medium.

2-2. Driving Environment Information

Using the sensors 20, the control device 100 acquires driving environment information 200 showing a driving environment of the vehicle 1. The driving environment information 200 is stored in the storage device 120.

Figure 3:
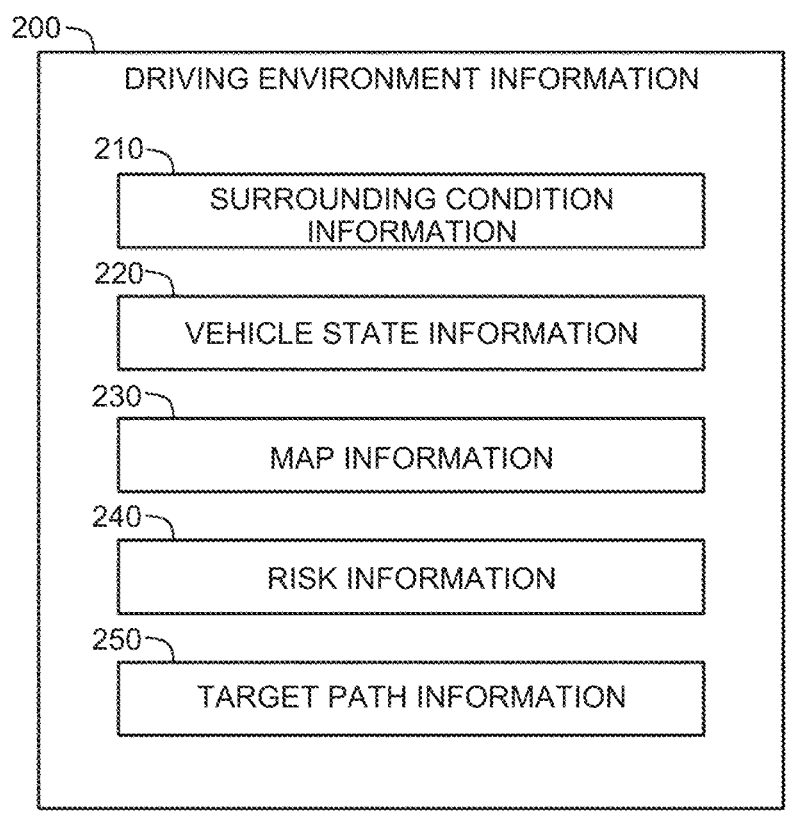
FIG. 3 is a block diagram showing an example of driving environment information according to the embodiment of this disclosure.

FIG. 3 is a block diagram showing an example of the driving environment information 200. The driving environment information 200 includes surrounding condition information 210, vehicle state information 220, map information 230, risk information 240, target path information 250, etc.

The surrounding condition information 210 is information showing recognition results of the recognition sensors 21 and shows the conditions around the vehicle 1. The control device 100 acquires the surrounding condition information 210 using the recognition sensors 21. For example, the surrounding condition information 210 includes image information captured by the camera. As another example, the surrounding condition information 210 includes point cloud information acquired by the LIDAR. The surrounding condition information 210 further includes object information about objects around the vehicle 1. Objects include obstacles that hinder travel of the vehicle 1. The object information shows a relative position and a relative speed of each object relative to the vehicle 1. For example, it is possible to identify an object and calculate the relative position of the object by analyzing the image information obtained by the camera. Further, it is possible to identify an object and acquire the relative position and the relative speed of the object based on the point cloud information obtained by the LIDAR.

The vehicle state information 220 is information showing states of the vehicle 1 and obtained from the vehicle state sensors 22. States of the vehicle 1 include a speed, an acceleration (a front-rear acceleration, a lateral acceleration, and an up-down acceleration), a yaw rate, a steering angle, etc.

The map information 230 is a map of an area where the vehicle 1 travels. The area where the vehicle 1 travels includes at least a point of departure and a destination of the vehicle 1. The map information 230 may include three-dimensional terrain information. When the vehicle 1 travels in a vast uneven surface, the map information 230 includes a map of that uneven surface. In some cases, however, a large part of the uneven surface is unknown. The map information 230 in that case is a rough map of the uneven surface. The map information 230 may show rough positions of known risks. The map information 230 is generated beforehand and stored in the storage device 120.

The risk information 240 shows a risk potential (risk distribution) around the vehicle 1. The risk potential shows a correspondence relationship between a position and a risk value (the magnitude of a risk). This risk potential is calculated based on the recognition results of the recognition sensors 21, i.e., the surrounding condition information 210. A method of calculating the risk potential will be described later.

The target path information 250 shows the target path PT for the vehicle 1 to reach the destination. A method of calculating the target path PT will be described later.

2-3. Vehicle Travel Control

The control device 100 executes "vehicle travel control" of controlling travel of the vehicle 1. The vehicle travel control includes steering control, acceleration control, and deceleration control. The control device 100 executes the vehicle travel control by controlling the travel devices 30 (the steering device, the driving device, and the braking device). Specifically, the control device 100 executes steering control by controlling the steering device. The control device 100 executes acceleration control by controlling the driving device. The control device 100 executes deceleration control by controlling the braking device.

The control device 100 may perform self-driving control based on the driving environment information 200. More specifically, the control device 100 generates a travel plan of the vehicle 1 based on the driving environment information 200. Further, based on the driving environment information 200, the control device 100 generates a target path PT required for the vehicle 1 to travel in accordance with the travel plan. The target path PT may include a target position and a target speed. The control device 100 performs the vehicle travel control such that the vehicle 1 follows the target path PT.

In an environment where a GNSS cannot be used, the position of the vehicle 1 relative to its initial position (point of departure) is grasped through dead reckoning, for example. Specifically, the speed, the steering angle, etc. of the vehicle 1 are obtained from the vehicle state information 220. The gradient of a road surface on which the vehicle 1 travels can be calculated from the acceleration detected by the acceleration sensor. The moving distance and the moving direction of the vehicle 1 can be calculated based on the speed, the steering angle, the gradient, etc. The position of the vehicle 1 is updated as the moving distance and the moving direction are calculated repeatedly once every certain period.

2-4. Risk Potential Calculation Process

The control device 100 recognizes risks around the vehicle 1 using the recognition sensors 21. Then, the control device 100 executes a "risk potential calculation process" of calculating a risk potential around the vehicle 1.

Figure 4:
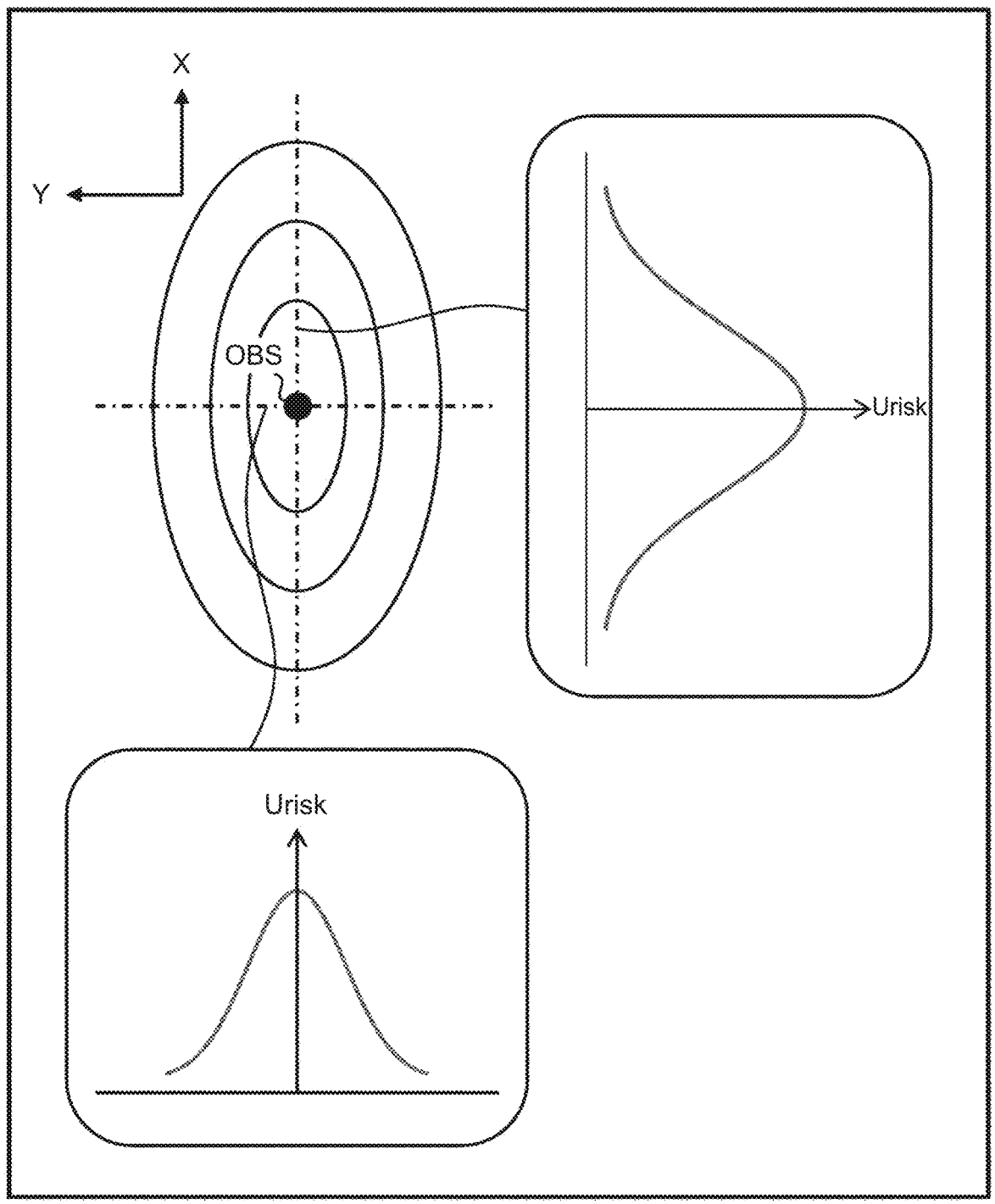
FIG. 4 is a conceptual view for describing a risk potential according to the embodiment of this disclosure.

FIG. 4 is a conceptual view for describing the risk potential. A risk value $U_{risk}$ is the magnitude of a risk relating to the vehicle's travel. A position where the risk value $U_{risk}$ is high is a position that the vehicle 1 should avoid. The risk potential represents the risk value $U_{risk}$ as a function of position. In other words, the risk potential shows a distribution of the risk value $U_{risk}$. For example, the risk potential is defined in a vehicle coordinate system (X, Y) fixed on the vehicle 1.

As one example, FIG. 4 shows a risk potential relating to an obstacle OBS present around the vehicle 1. The risk potential relating to the obstacle OBS is for keeping the vehicle 1 away from the obstacle OBS. Therefore, the risk value $U_{risk}$ becomes largest at the position of the obstacle OBS and becomes smaller as the distance from the obstacle OBS increases. For example, the risk potential is represented by a gaussian distribution (normal distribution). The spread of the distribution may vary with the type of obstacle OBS. The spread of the distribution may change according to the speed of the vehicle 1. For example, the spread of the distribution may become wider as the speed becomes higher. Information on a function that specifies the shape of such a risk potential is given to the control device 100 beforehand.

The obstacle OBS is recognized by the recognition sensors 21. Information on the obstacle OBS is obtained from the surrounding condition information 210 (obstacle information). The relative position of the obstacle OBS as seen from the vehicle 1 is also obtained from the surrounding condition information 210 (obstacle information). Thus, the control device 100 can calculate, in real time, the risk potential around the vehicle 1 based on the recognition results of the recognition sensors 21, i.e., the surrounding condition information 210. When there is a plurality of risks around the vehicle 1, risk potentials relating to the respective risks are added up. The risk information 240 shows the risk potential thus calculated.

A predetermined range around the vehicle 1 may be divided in a lattice form, and the risk value $U_{risk}$ may be given on each grid. In this case, the risk potential can also be called a risk grid.

2-5. Target Path Calculation Process

Further, the control device 100 executes a "target path calculation process" of calculating the target path PT for the vehicle 1 to reach the destination. The target path information 250 shows a target path PT obtained by the target path calculation process. In the following, the target path calculation process according to this embodiment will be described in more detail.

3. Target Path Calculation Process

Figure 5:
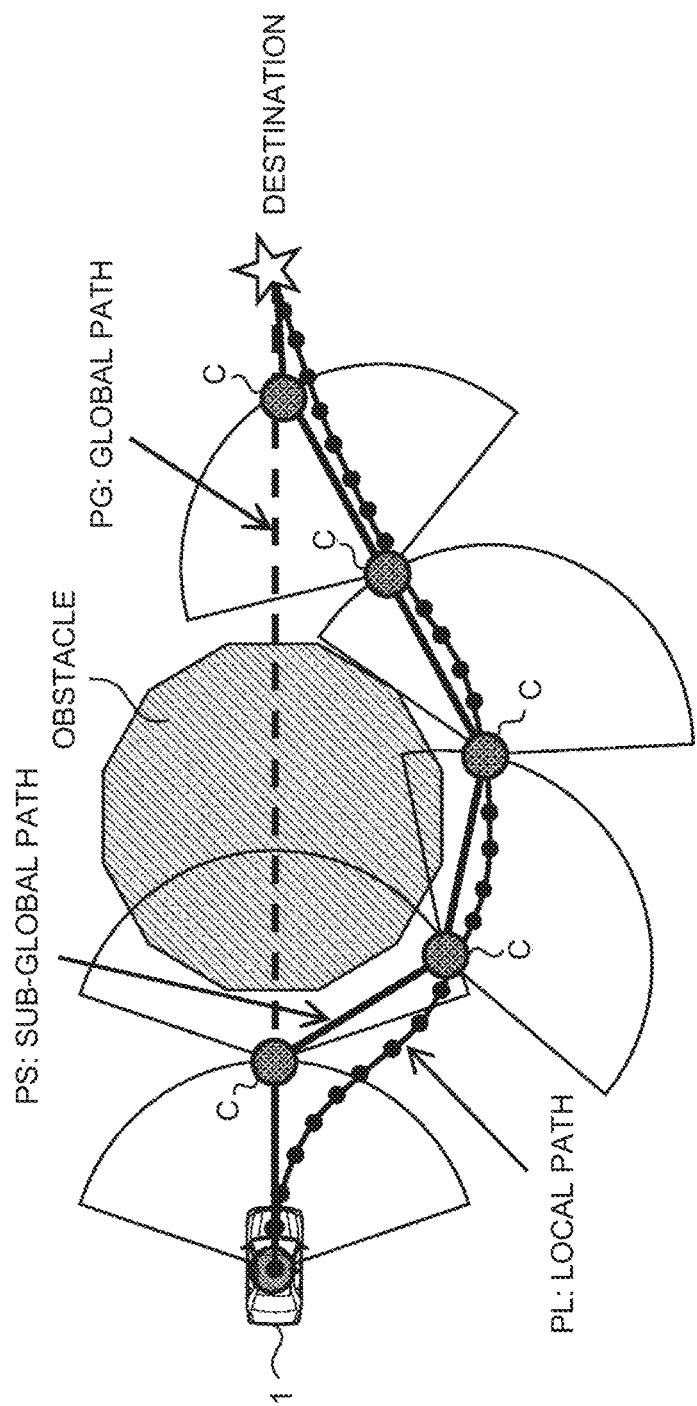
FIG. 5 is a conceptual view for describing an outline of a target path calculation process according to the embodiment of this disclosure.

FIG. 5 is a conceptual view for describing an outline of the target path calculation process according to this embodiment. According to this embodiment, target paths PT include three types: a "global path PG," a "sub-global path PS," and a "local path PL."

The global path PG is a rough target path PT to the destination and determined beforehand.

The sub-global path PS (first target path) is a target path PT for moving to the destination while avoiding risks around the vehicle 1. Thus, the sub-global path PS is a target path PT that allows risks to be avoided while the predetermined global path PG is followed as much as possible. As described above, risks around the vehicle 1 are recognized by the recognition sensors 21 installed in the vehicle 1. Therefore, the control device 100 can calculate the sub-global path PS based on the global path PG and the recognition results of the recognition sensors 21. As shown in FIG. 5, for example, the sub-global path PS is represented by a set of a plurality of path candidate points (transit points) C arrayed at regular intervals. Thus, the sub-global path PS is formed by connecting a plurality of path candidate points (transit points) C arrayed at regular intervals.

The local path PL (second target path) is a target path PT having higher granularity than the sub-global path PS. Based on the sub-global path PS, the control device 100 calculates the local path PL having higher granularity. More specifically, the local path PL is calculated such that travel stability of the vehicle 1 is secured while the sub-global path PS is followed as much as possible. For example, as shown in FIG. 5, the sub-global path PS is represented by a set of a plurality of path candidate points C, and the local path PL is calculated so as to be smoother than the sub-global path PS. When a smooth local path PL is used, sudden steering or overturn of the vehicle 1 can be prevented. For example, taking the sub-global path PS and the target yaw rate of the vehicle 1 into account, the control device 100 calculates a local path PL that allows travel stability of the vehicle 1 to be secured while the sub-global path PS is followed as much as possible.

The sub-global path PS (first target path) can be said to be a long-range target path PT based on a relatively long-term travel plan. On the other hand, the local path PL (second target path) can be said to be a short-range target path PT based on a relatively short-term travel plan. The local path PL is shorter than the sub-global path PS and has higher granularity than the sub-global path PS.

Thus, the control device 100 calculates the sub-global path PS and the local path PL stepwise based on the predetermined global path PG as the standard. Then, the control device 100 performs the vehicle travel control so as to follow the local path PL.

In the following, the global path PG, the sub-global path PS, and the local path PL will be described in more detail.

3-1. Global Path PG

Figure 6:
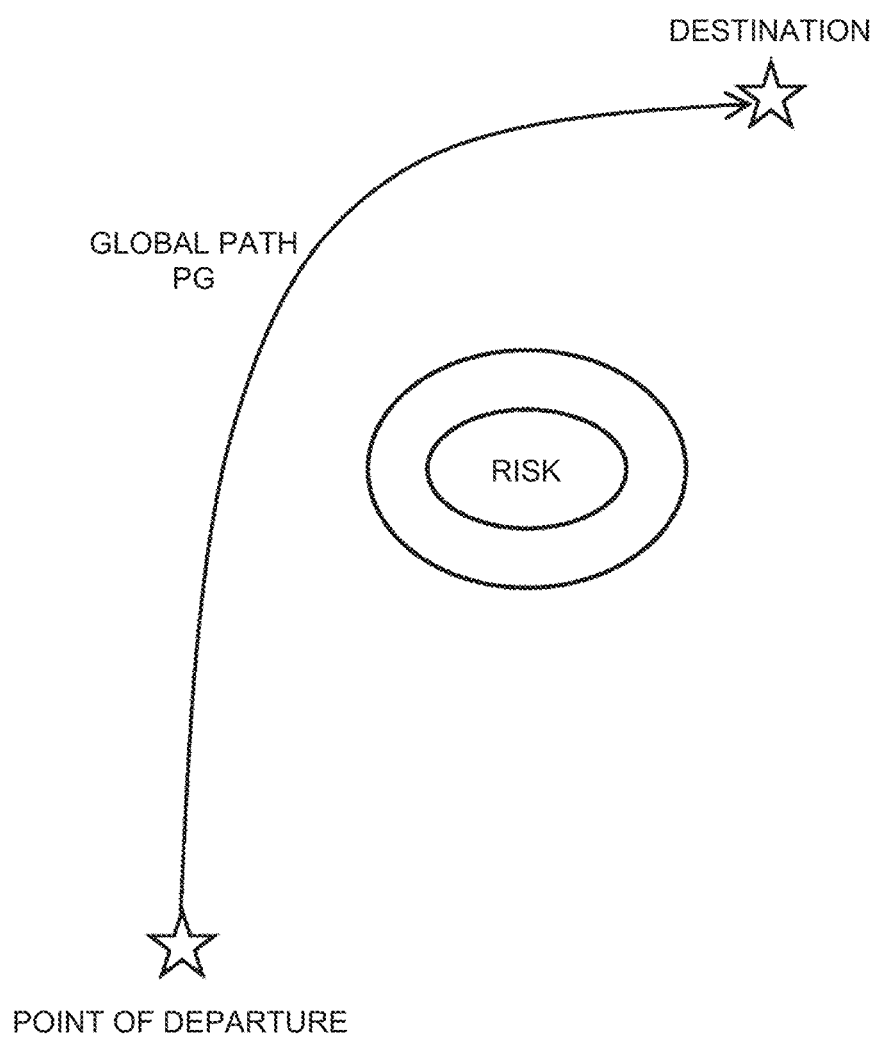
FIG. 6 is a conceptual view for describing a global path according to the embodiment of this disclosure.

FIG. 6 is a conceptual view for describing the global path PG. The global path PG is a static target path PT from a point of departure to a destination. The global path PG is determined beforehand based on the map information 230. For example, a person who operates the vehicle 1 determines the global path PG beforehand by referring to the map information 230. As another example, the control device 100 may determine the global path PG beforehand based on the map information 230. The target path information 250 includes position information on the determined global path PG.

For example, when the vehicle 1 travels on a vast uneven surface, the map information 230 includes a map of that uneven surface. In some cases, a large part of the uneven surface is unknown. The map information 230 may show only rough positions of known risks. In that case, a target path PT for reaching the destination while avoiding the known risks is set as the global path PG.

3-2. Sub-Global Path PS

Figure 7:
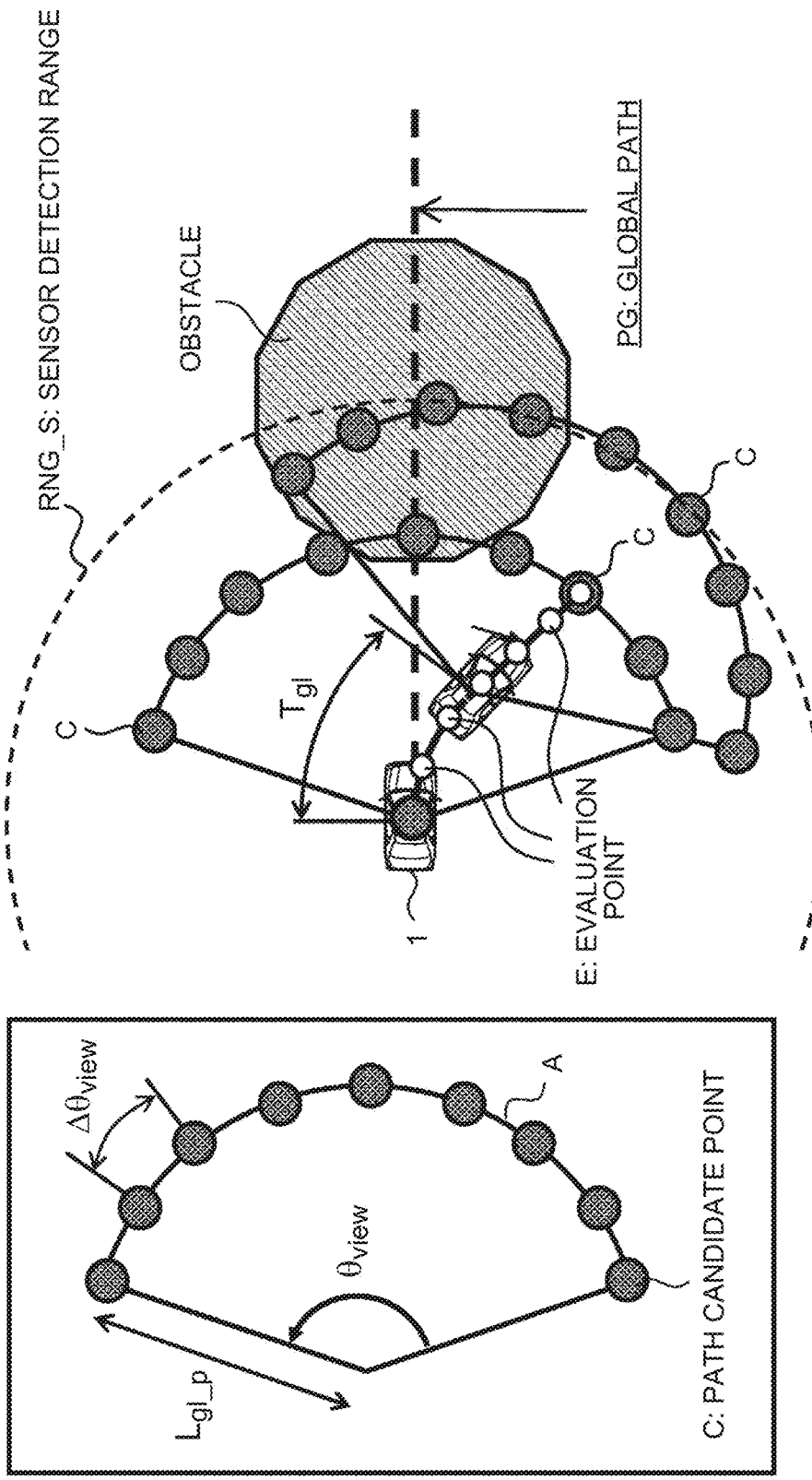
FIG. 7 is a conceptual view for describing a method of calculating a sub-global path according to the embodiment of this disclosure.

FIG. 7 is a conceptual view for describing a method of calculating the sub-global path PS. A sensor detection range RNG_S is a range recognizable by the recognition sensors 21 installed in the vehicle 1. Based on the recognition results of the recognition sensors 21, the control device 100 recognizes risks (e.g., obstacles) in the sensor detection range RNG_S and calculates the risk potentials in real time. The risk potential represents the risk value $U_{risk}$ as a function of position. The risk information 240 shows the calculated risk potentials.

Meanwhile, the control device 100 sets an imaginary arc A lying ahead of the vehicle 1. More specifically, the arc A is a predetermined distance $L_{gl\_p}$ away from the position of the vehicle 1 in a radial direction and extends over an angle of view $\theta_{view}$ in a circumferential direction. A plurality of path candidate points C is temporarily set on this arc A. An interval between adjacent path candidate points C on the arc A is an angle $\Delta\theta_{view}$.

Subsequently, for each path candidate point C on the arc A, a path candidate for reaching the path candidate point C from the position of the vehicle 1 is calculated. This path candidate is formed by steady turn at a constant yaw rate and translatory movement. Further, $N_{semi}$ evaluation points E are set on each path candidate. $N_{semi}$ is an integer not smaller than one. For example, $N_{semi}$ is ten. For each path candidate, the control device 100 calculates a first evaluation value $J_{semi}$ expressed by the following Formula (1):

[Formula 1]

$$J_{semi} = \sum_{i_{semi}=1}^{N_{semi}} [H1 + H2 + H3 + H4] \qquad (1)$$

$$= \sum_{i_{semi}=1}^{N_{semi}} \begin{bmatrix} w_{s\_r} U_{risk}(X_p(i_{semi}), Y_p(i_{semi})) + \\ w_{s\_d}(D_{gl}(i_{semi})) + \\ w_{s\_g} \dfrac{L_{goal}(i_{semi})}{V} + \\ w_{s\_z} D_z(i_{semi}) \end{bmatrix}$$

In Formula (1), $i_{semi}$ assumes a value from one to $N_{semi}$. $[X_p, Y_p]$ is a coordinate of the evaluation point E. $U_{risk}(X_p, Y_p)$ is a risk value at the evaluation point E and can be obtained from the risk information 240. $D_{gl}$ is a distance (deviation) between the evaluation point E and the global path PG and calculated from the position information on the global path PG (target path information 250). $L_{goal}$ is a distance from the evaluation point E to the destination and calculated based on the map information 230. V is a vehicle speed and obtained from the vehicle state information 220. $D_z$ is a difference in elevation between the position of the vehicle 1 and the evaluation point E and calculated from the surrounding condition information 210. $w_{s\_r}$, $w_{s\_d}$, $w_{s\_g}$, and $w_{s\_z}$ are weighting factors that are set beforehand.

The term H1 on the right side of Formula (1) represents the risk value $U_{risk}$ at the path candidate. The first evaluation value $J_{semi}$ becomes smaller as the risk value $U_{risk}$ at the path candidate becomes smaller. The term H2 represents the deviation from the predetermined global path PG. The first evaluation value $J_{semi}$ becomes smaller as the deviation from the predetermined global path PG becomes smaller. The term H3 represents a time taken to reach the destination. The first evaluation value $J_{semi}$ becomes smaller as the time taken to reach the destination becomes shorter. The term H4 represents a difference in elevation that is one type of risk. The first evaluation value $J_{semi}$ becomes smaller as the difference in elevation becomes smaller.

Based on the driving environment information 200, the control device 100 calculates the first evaluation value $J_{semi}$ for each path candidate. Then, the control device 100 selects a path candidate for which the first evaluation value $J_{semi}$ is smallest, i.e., such a path candidate point C that the first evaluation value $J_{semi}$ becomes smallest. Thus, the control device 100 searches for and selects such a path candidate point C that the first evaluation value $J_{semi}$ becomes smallest. Further, on the assumption that the vehicle 1 has moved to the selected path candidate point C, the control device 100 may search for and select the next path candidate point C. The sub-global path PS is represented by a set of a plurality of path candidate points C that is arrayed at regular intervals $L_{gl\_p}$.

In this way, the control device 100 calculates the sub-global path PS such that the first evaluation value $J_{semi}$ becomes smallest. As a result, a sub-global path PS for moving to the destination while avoiding risks around the vehicle 1 is obtained. That is, a sub-global path PS that allows risks to be avoided while the static global path PG is followed as much as possible is obtained. The target path information 250 includes position information on the calculated sub-global path PS (path candidate point C).

The control device 100 updates the sub-global path PS once every update period $T_{gl}$. That is, the control device 100 repeatedly calculates the sub-global path PS once every update period $T_{gl}$. For example, the update period $T_{gl}$ of the sub-global path PS is given by the following Formula (2):

[Formula 2]

$$T_{gl} = \frac{L_{gl\_p}}{V} \frac{1}{n} \quad (2)$$

In Formula (2), n is a period adjustment parameter. For example, n is 8. The update period $T_{gl}$ of the sub-global path PS depends on a vehicle speed V As the vehicle speed V becomes higher, the update period $T_{gl}$ becomes shorter.

3-3. Local Path PL

Figure 8:
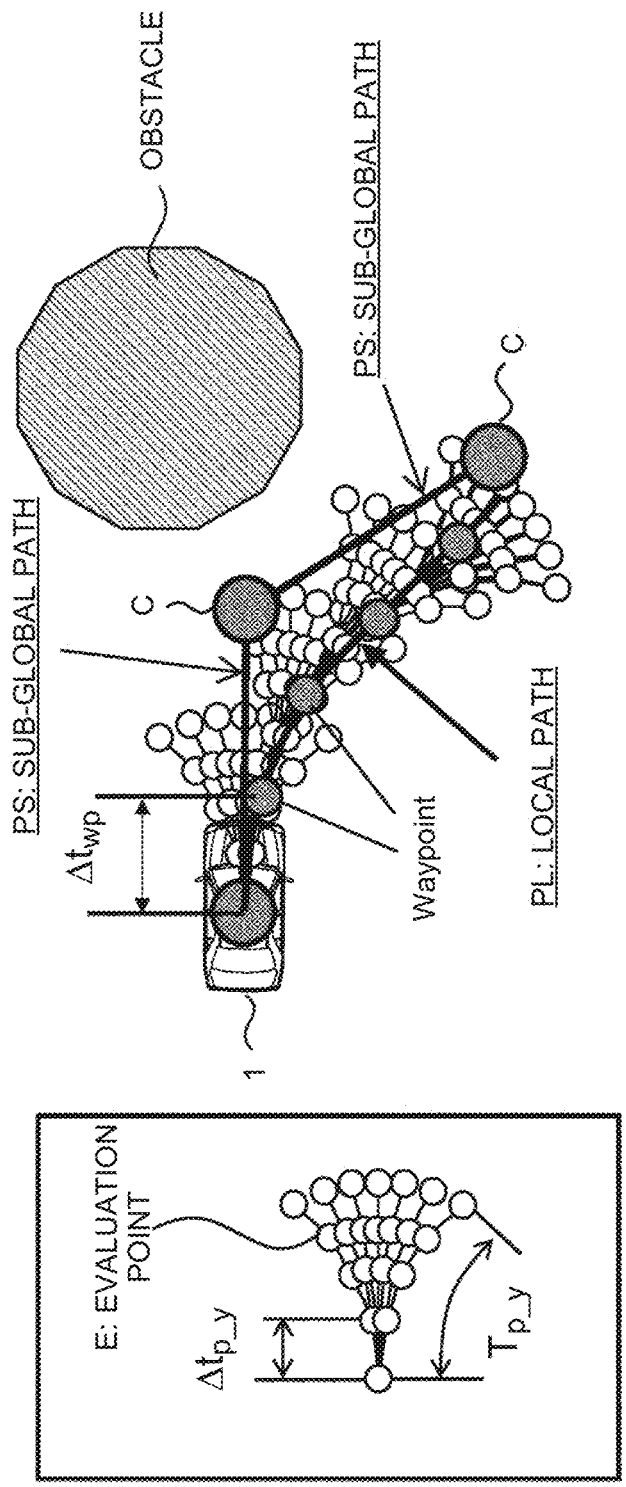
FIG. 8 is a conceptual view for describing a method of calculating a local path according to the embodiment of this disclosure.

FIG. 8 is a conceptual view for describing a method of calculating the local path PL. The control device 100 evaluates the vehicle's behavior relative to various target yaw rate candidates $r_p$ based on a mass point model of the vehicle 1. Here, it is assumed that the vehicle speed V is constant.

The evaluation period $T_{p\_y}$ is a period for evaluating the vehicle's behavior relative to various target yaw rate candidates $r_p$. $N_y$ evaluation points E are set for this evaluation period $T_{p\_y}$. $N_y$ is an integer not smaller than one. For example, the evaluation period $T_{p\_y}$ is divided into unit periods $\Delta t_{p\_y}$ and the evaluation point E is set for each unit period $\Delta t_{p\_y}$. $\Delta t_{p\_y}$ can be said to be a time interval (time step) between adjacent evaluation points E. For each target yaw rate candidate $r_p$, the control device 100 calculates a second evaluation value $J_{local}$ represented by the following Formula (3):

[Formula 3]

$$J_{local} = \sum_{i_y=1}^{N_y} [H5 + H6 + H7 + H8 + H9] \quad (3)$$

$$= \sum_{i_y=1}^{N_y} \begin{bmatrix} w_{ly\_r} U_{risk}(X_p(i_y), Y_p(i_y)) + \\ w_{ly\_d}(D_{semi}(i_y)) + \\ w_{ly\_e}(F_\mu + F_\theta(i_y) + F_r(i_y))u\Delta t_{p\_y} + \\ w_{ly\_g} \frac{L_{semi}(i_y)}{V} + \\ r_y(r_p - r)^2 \end{bmatrix}$$

In Formula (3), $i_y$ assumes a value from one to $N_y$. $[X_p, Y_p]$ is a coordinate of the evaluation point E. $U_{risk}(X_p, Y_p)$ is a risk value at the evaluation point E and obtained from the risk information 240. $D_{semi}$ is a distance (deviation) between the evaluation point E and the sub-global path PS and calculated from the position information on the sub-global path PS (target path information 250). $F_\mu$ is rolling frictional resistance. $F_\theta$ is gradient resistance. $F_r$ is turning resistance. V and μ are a vehicle speed and a front-rear speed, respectively. These are obtained from the vehicle state information 220. $L_{semi}$ is the distance to the path candidate point C and obtained from the position information on the sub-global path PS (target path information 250). $r_p$ is a target yaw rate candidate. r is a current yaw rate and obtained from the vehicle state information 220. $w_{ly\_r}$, $w_{ly\_a}$, $w_{ly\_e}$, $w_{ly\_g}$, and $r_y$ are weighting factors that are set beforehand.

The term H5 on the right side of Formula (3) represents the risk value $U_{risk}$. The second evaluation value $J_{local}$ becomes smaller as the risk value $U_{risk}$ becomes smaller. The term H6 represents the deviation from the sub-global path PS. The second evaluation value $J_{local}$ becomes smaller as the deviation from the sub-global path PS becomes smaller. The term H7 represents energy consumption. The second evaluation value $J_{local}$ becomes smaller as the energy consumption becomes smaller. The term H8 represents a time taken to reach the path candidate point C. The second evaluation value $J_{local}$ becomes smaller as the time to reach the path candidate point C becomes shorter. The term H9 includes the difference between the current yaw rate r and the target yaw rate $r_p$ and represents "smoothness" of steering. The second evaluation value $J_{local}$ becomes smaller as the difference between the current yaw rate r and the target yaw rate $r_p$ becomes smaller, i.e., as steering becomes smoother.

Based on the driving environment information 200, the control device 100 calculates the second evaluation value $J_{local}$ for each target yaw rate candidate $r_p$. Then, the control device 100 selects, as a target yaw rate r*, such a target yaw rate candidate $r_p$ that the second evaluation value $J_{local}$ becomes smallest. The local path PL is a target path according to the target yaw rate $r^*$.

In other words, the target yaw rate $r^*$ is a yaw rate required for the vehicle 1 to follow the local path PL. The second evaluation value $J_{local}$ becomes smaller as the deviation between the sub-global path PS and the local path PL becomes smaller. The second evaluation value $J_{local}$ becomes smaller as the difference between the current yaw rate r and the target yaw rate $r^*$ becomes smaller. The control device 100 calculates the local path PL such that the second evaluation value $J_{local}$ becomes smallest. Thus, a local path PL that is smoother than the sub-global path PS is obtained. That is, a local path PL that allows travel stability of the vehicle 1 to be secured while the sub-global path PS is followed as much as possible is obtained. The target path information 250 includes information on the calculated local path PL (target yaw rate $r^*$).

The control device 100 sets a waypoint and updates the local path PL (target yaw rate $r^*$) once every update period $\Delta t_{wp}$. Thus, the control device 100 repeatedly calculates the local path PL (target yaw rate $r^*$) once every update period $\Delta t_{wp}$.

3-4. Processing Flow

Figure 9:
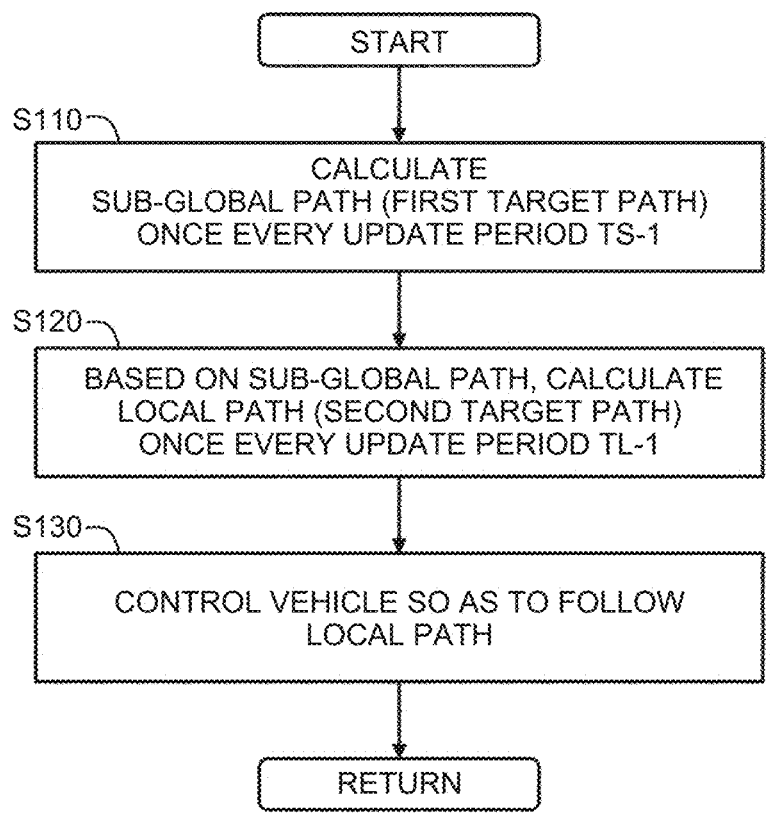
FIG. 9 is a flowchart briefly showing the target path calculation process and the vehicle control according to the embodiment of this disclosure.

FIG. 9 is a flowchart briefly showing the target path calculation process and the vehicle control according to the embodiment.

In step S110, the control device 100 calculates the sub-global path PS once every update period TS-1 (e.g., the aforementioned update period $T_{gl}$).

In step S120, the control device 100 calculates the local path PL once every update period TL-1 (e.g., the aforementioned update period $\Delta t_{wp}$) based on the latest sub-global path PS. The update period TL-1 of the local path PL is shorter than the update period TS-1 of the sub-global path PS (TL-1<TS-1). In other words, the frequency of update of the local path PL is higher than the frequency of update of the sub-global path PS.

In step S130, the control device 100 controls the vehicle 1 so as to follow the local path PL.

In this way, according to this embodiment, it is possible to calculate, in real time, a sub-global path PS for moving to the destination while avoiding risks even in a situation where a GNSS cannot be used. Moreover, it is possible to prevent sudden steering or overturn of the vehicle 1 by controlling the vehicle 1 according to the local path PL that is smoother than the sub-global path PS.

4. Target Path Calculation Process According to Type of Field 4-1. Outline

The target path calculation process described in Section 3 above is a default target path calculation process. The contents of the target path calculation process may be flexibly adjusted according to the environment or circumstances surrounding the vehicle 1. In the following, a target path calculation process that takes into account the type of field in which the vehicle 1 travels will be described as one example.

Figure 10:
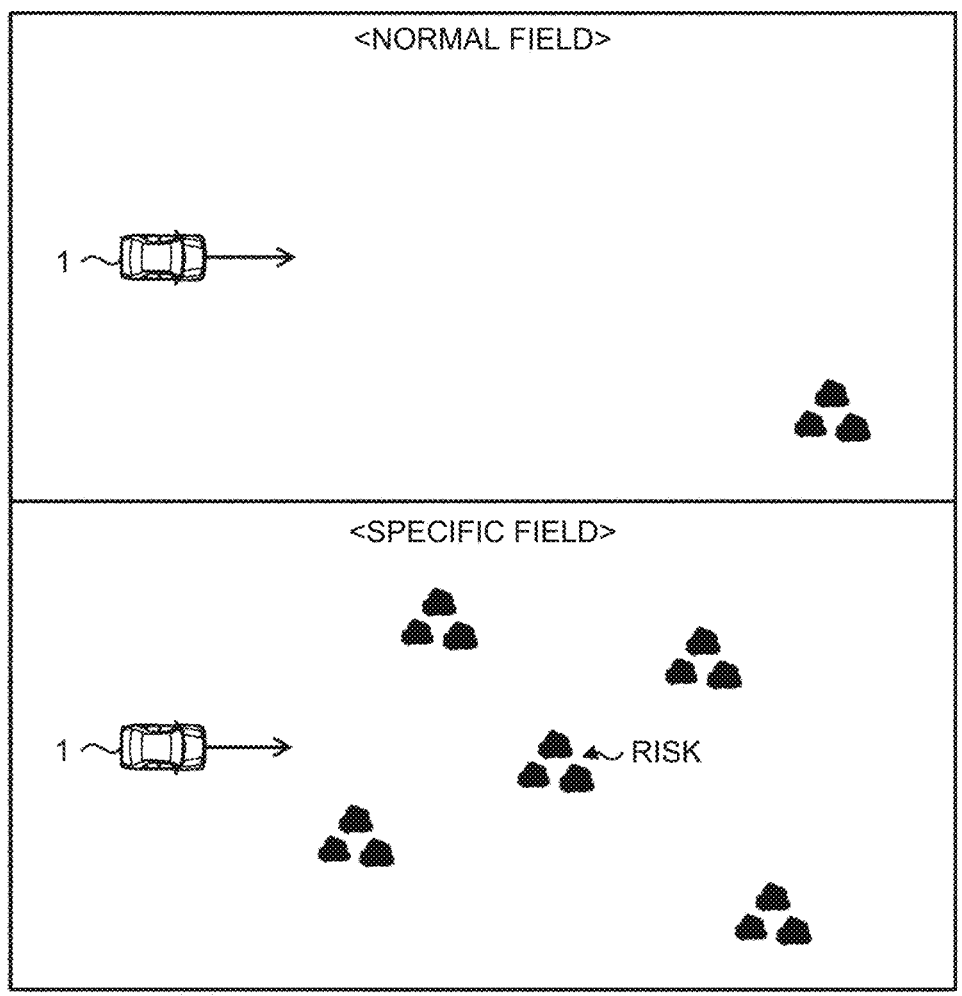
FIG. 10 is a conceptual view for describing a normal field and a specific field according to the embodiment of this disclosure.

FIG. 10 is a conceptual view for describing a "normal field" and a "specific field." The normal field is a field with relatively few risks. The specific field is a field with relatively many risks. Thus, the specific field is a field with more risks than the normal field. For example, the normal field is a field in which a risk density per unit area is lower than a threshold value, and the specific field is a field in which the risk density per unit area is equal to or higher than the threshold value. The control device 100 can determine in which of the normal field and the specific field the vehicle 1 travels based on at least either the surrounding condition information 210 (the recognition results of the recognition sensors 21) or the map information 230.

Figure 11:
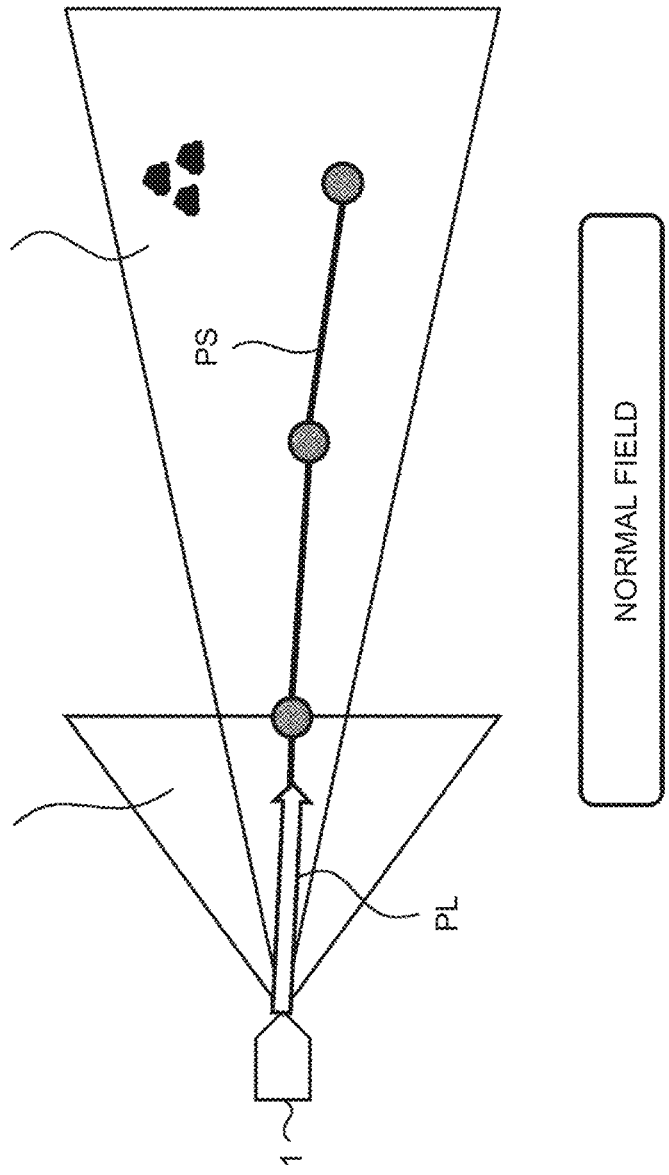
FIG. 11 is a conceptual view for describing the target path calculation process in the case of the normal field according to the embodiment of this disclosure.

FIG. 11 is a conceptual view for describing the target path calculation process in the case of the normal field. When the vehicle 1 travels in the normal field, the control device 100 executes the default target path calculation process described in Section 3 above.

Here, two ranges RNG_1, RNG_2 shown in FIG. 11 will be described. The first range RNG_1 is a range in which the sub-global path PS (first target path) is calculated. On the other hand, the second range RNG_2 is a range in which the local path PL (second target path) is calculated. The first range RNG_1 and the second range RNG_2 are both set ahead of the vehicle 1. As seen from the vehicle 1, the first range RNG_1 covers a farther position than the second range RNG_2. For example, the first range RNG_1 covers a distance equivalent to the aforementioned sensor detection range RNG_S (see FIG. 7). It can be said that the sub-global path PS is a long-range target path PT calculated in the first range RNG_1, and that the local path PL is a short-range target path PT calculated in the second range RNG_2.

Next, the target path calculation process in the case of the specific field will be described with reference to FIG. 12 and FIG. 13.

Figure 12:
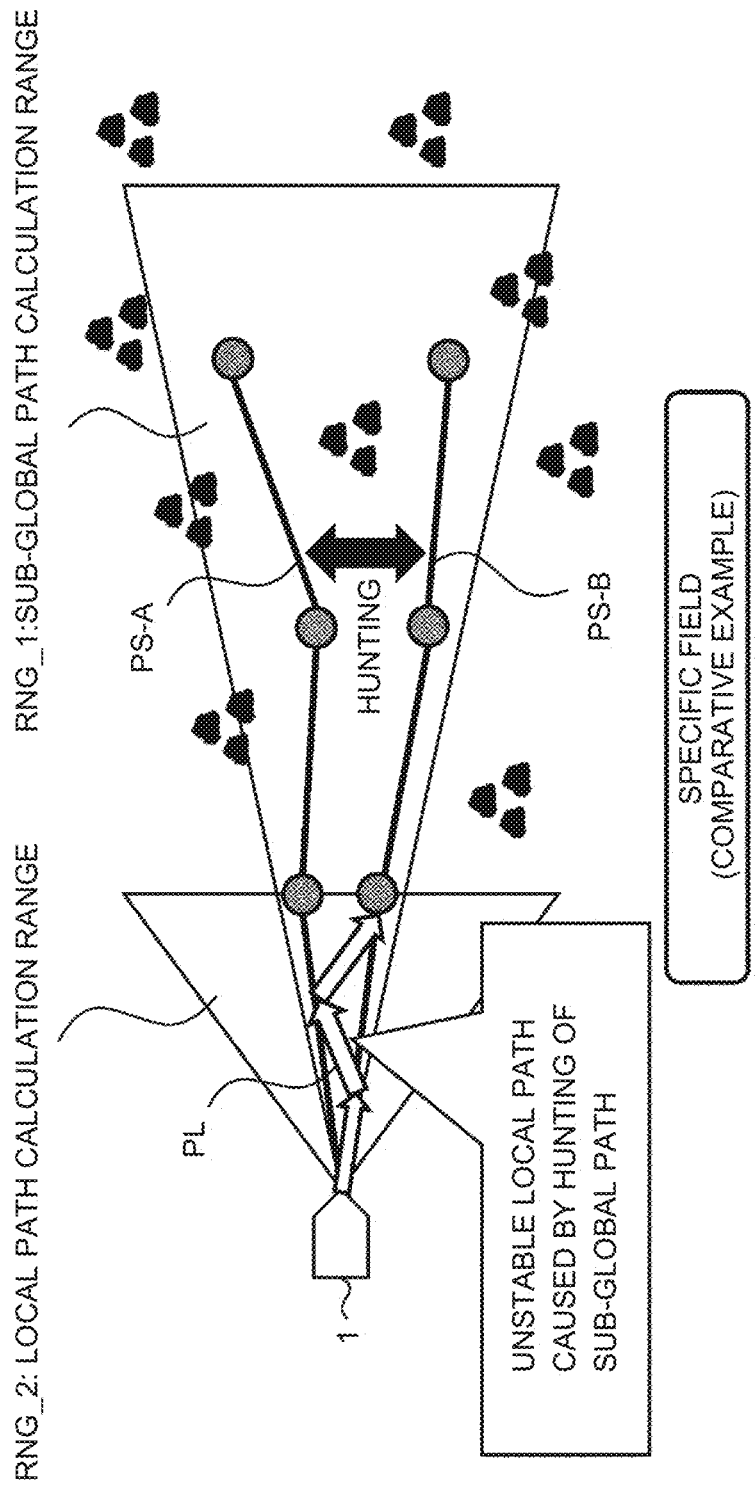
FIG. 12 is a conceptual view for describing a problem.

FIG. 12 shows a comparative example. In the comparative example, the default target path calculation process is executed also in the specific field as in the case of the normal field. As described above, the specific field has more risks than the normal field. Therefore, the long-range sub-global path PS that is calculated and updated so as to avoid risks may frequently hunt (oscillate). In the example shown in FIG. 12, the sub-global path PS-A passing on an upper side and the sub-global path PS-B passing on a lower side alternate frequently. When the sub-global path PS hunts, the local path PL calculated and updated based on that sub-global path PS also becomes unstable. When the local path PL becomes unstable, the stability of the vehicle 1 following the local path PL decreases. Further, when the local path PL does not become stable, the vehicle 1 strays (moves right and left in confusion). Straying of the vehicle 1 causes an increase in moving time or fuel consumption. These are unfavorable from the viewpoint of satisfaction of the user of the vehicle 1.

Figure 13:
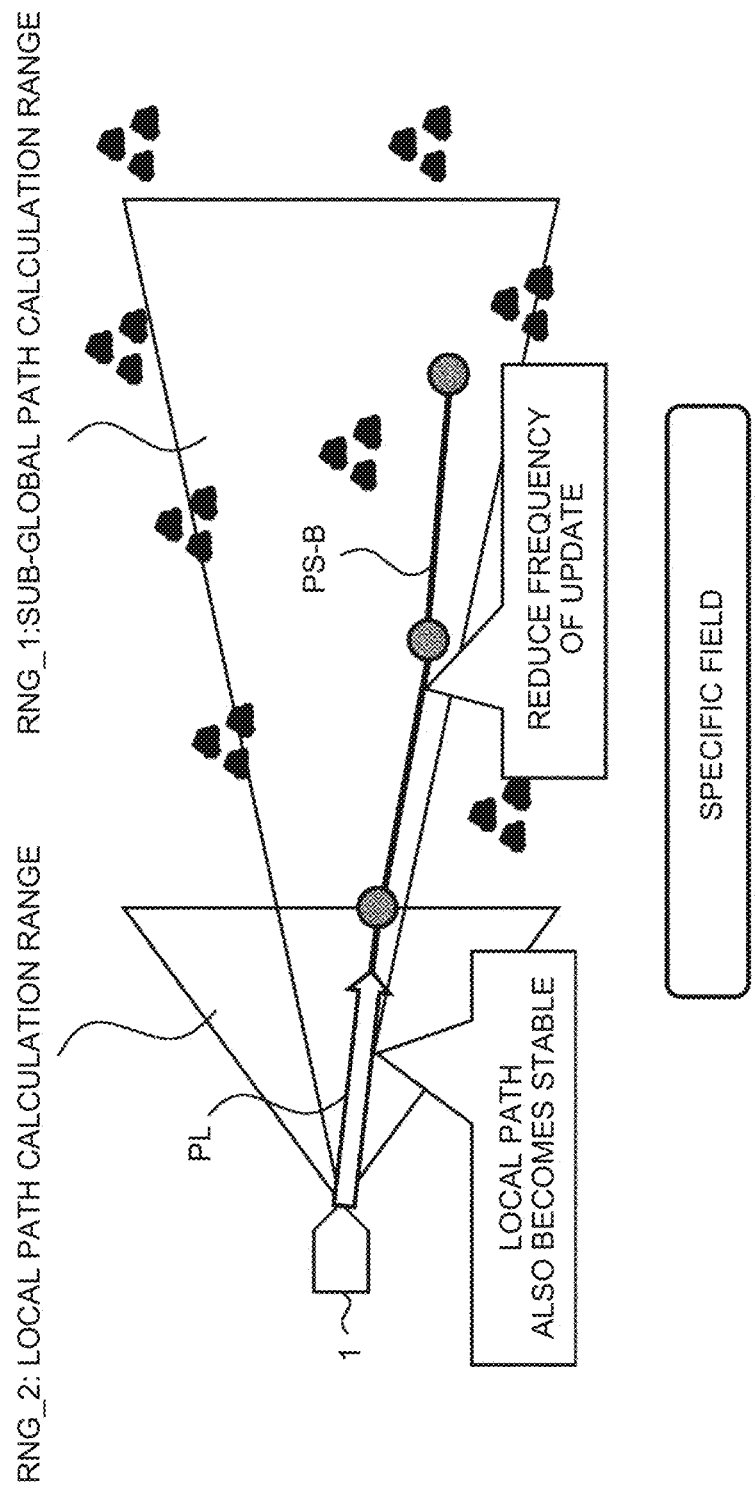
FIG. 13 is a conceptual view for describing the target path calculation process in the case of the specific field according to the embodiment of this disclosure.

FIG. 13 is a conceptual view for describing the target path calculation process in the case of the specific field. When the vehicle 1 travels in the specific field, the control device 100 reduces the frequency of update of the sub-global path PS compared with that in the case of the normal field. In other words, the control device 100 extends the update period of the sub-global path PS compared with the default update period TS-1. As the frequency of update of the sub-global path PS decreases, hunting of the sub-global path PS at the time of update is reduced. As hunting of the sub-global path PS is reduced, the local path PL calculated and updated based on the sub-global path PS becomes stable.

Reducing the frequency of update of the sub-global path PS includes temporarily stopping updating the sub-global path PS. For example, after once calculating the sub-global path PS in a predetermined range, the control device 100 stops (prohibits) update of the sub-global path PS in that predetermined range. The predetermined range is, for example, the aforementioned first range RNG_1. In this case, the control device 100 continues to hold the once calculated sub-global path PS throughout the first range RNG_1. That is, the control device 100 continues to hold the previous value of the sub-global path PS without updating the sub-global path PS. As the sub-global path PS is fixed, the local path PL calculated and updated based on the sub-global path PS becomes stable.

Thus, according to this embodiment, it is possible to reduce hunting of the sub-global path PS and stabilize the local path PL even in an environment where there are many risks. As the local path PL becomes stable, stability of the vehicle 1 following the local path PL is secured, and also straying of the vehicle 1 is reduced. As straying of the vehicle 1 is reduced, the moving time or fuel consumption is kept from increasing unnecessarily. These are favorable from the viewpoint of satisfaction of the user of the vehicle 1.

4-2. Two Types of Control Modes

Figures 14, 15:
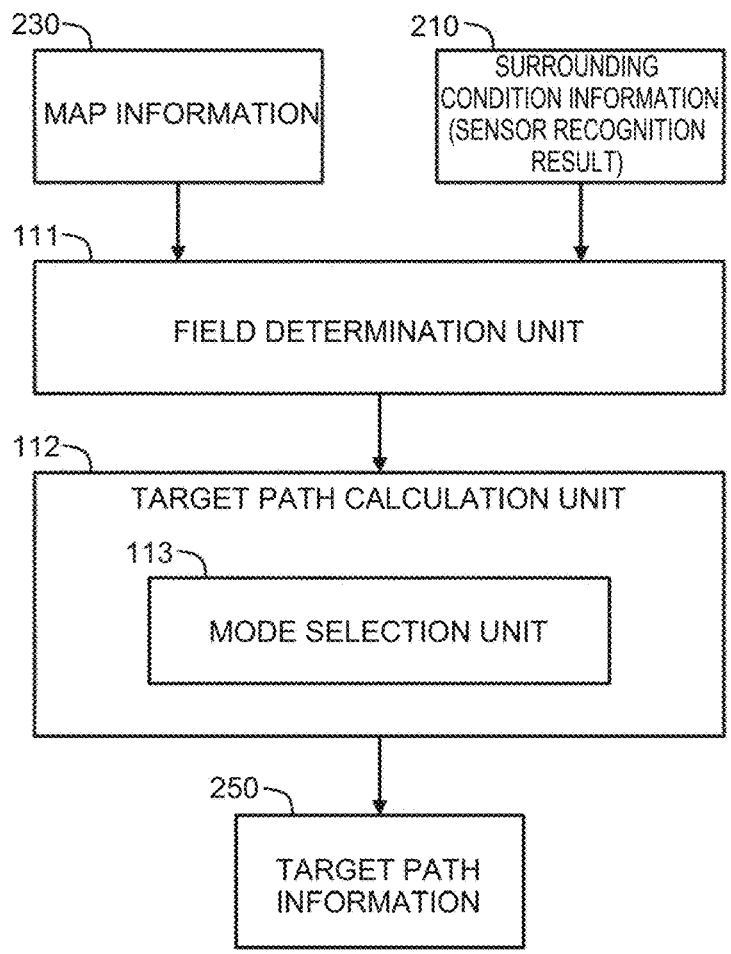
FIG. 14 is a conceptual view showing correspondence relationships between the types of fields and control modes according to the embodiment of this disclosure.
FIG. 15 is a block diagram showing an example of functional components involved in the target path calculation process according to the embodiment of this disclosure.

FIG. 14 is a conceptual view showing correspondence relationships between the types of fields and control modes. The control device 100 switches the control mode according to the type of field. Specifically, when the type of field is the normal field, the control device 100 selects a first mode (flat mode) and executes the target path calculation process in the first mode. On the other hand, when the type of field is the specific field, the control device 100 selects the second mode (off-road mode) and executes the target path calculation process in the second mode.

In the first mode, the update period of the sub-global path PS is the default update period TS-1, and the update period of the local path PL is the default update period TL-1. The default update period TL-1 of the local path PL is shorter than the default update period TS-1 of the sub-global path PS (TL-1<TS-1). The control device 100 calculates the sub-global path PS once every default update period TS-1 and calculates the local path PL once every default update period TL-1.

In the second mode, the update period of the sub-global path PS is an adjusted update period TS-2, and the update period of the local path PL is an adjusted update period TL-2. The adjusted update period TS-2 in the case of the second mode is longer than the default update period TS-1 in the case of the first mode (TS-2>TS-1). Thus, the frequency of update of the sub-global path PS in the case of the second mode is higher than that in the case of the first mode. In the case of the second mode, update of the sub-global path PS may be temporarily stopped.

In the second mode, the reduced frequency of update of the sub-global path PS allows computer resources to be spared. The spare computer resources may be allocated to calculation of the local path PL. That is, in the second mode, the frequency of update of the local path PL may be set to an adjusted update period TL-2 shorter than the default update period TL-1 (TL-2<TL-1). This means that the frequency of update of the local path PL in the case of the second mode may be higher than that in the case of the first mode. Thus, the granularity of the local path PL increases further and finer vehicle control becomes possible.

4-3. Example of Processing

FIG. 15 is a block diagram showing an example of a functional configuration involved in the target path calculation process. The control device 100 (processor 110) includes a field determination unit 111 and a target path calculation unit 112 as functional blocks.

The field determination unit 111 executes a "field determination process" of determining in which of the normal field and the specific field the vehicle 1 travels. For example, the normal field is a field where the risk density per unit area is lower than the threshold value, and the specific field is a field where the risk density per unit area is equal to or higher than the threshold value. The field determination unit 111 can perform the field determination process by recognizing risks around the vehicle 1 based on the surrounding condition information 210 (the recognition results of the recognition sensors 21).

As another example, the positions of risks may be registered in the map information 230. In this case, the field determination unit 111 can perform the field determination process by recognizing the risks around the vehicle 1 based on the map information 230.

As yet another example, an area where the vehicle 1 travels may be classified beforehand into the normal field and the specific field. In this case, the map information 230 shows classification of the normal field and the specific field. The field determination unit 111 can perform the field determination process based on such map information 230.

The field determination unit 111 performs the field determination process based on at least either the surrounding condition information 210 (the recognition results of the recognition sensors 21) or the map information 230. The field determination unit 111 may perform the field determination process based on both the surrounding condition information 210 (the recognition results of the recognition sensors 21) and the map information 230.

FIG. 16 is a conceptual view for describing examples of the field determination process. In the example shown in FIG. 16, the field determination process is performed based on both the map information 230 and the surrounding condition information 210 (the recognition results of the recognition sensors 21). By combinations of the determination result based on the map information 230 and the determination result based on the surrounding condition information 210, the following four patterns are conceivable.

Pattern 1

The determination result based on the map information 230 is the "normal field" and the determination result based on the surrounding condition information 210 is also the "normal field." Thus, both determination results match. In this case, the field determination unit 111 determines as final that the vehicle 1 travels in the "normal field."

Pattern 2

The determination result based on the map information 230 is the "specific field" and the determination result based on the surrounding condition information 210 is the "normal field." Thus, both determination results do not match. In this case, the field determination unit 111 prioritizes the actual recognition results of the recognition sensors 21 and determines as final that the vehicle 1 travels in the "normal field."

Pattern 3

The determination result based on the map information 230 is the "specific field" and the determination result based on the surrounding condition information 210 is also the "specific field." Thus, both determination results match. In this case, the field determination unit 111 determines as final that the vehicle 1 travels in the "specific field."

Pattern 4

The determination result based on the map information 230 is the "normal field" and the determination result based on the surrounding condition information 210 is the "specific field." Thus, both determination results do not match. In this case, the field determination unit 111 prioritizes the actual recognition results of the recognition sensors 21 and determines as final that the vehicle 1 travels in the "specific field."

The target path calculation unit 112 executes the target path calculation process according to the result of the field determination process. The target path calculation unit 112 includes a mode selection unit 113. The mode selection unit 113 selects the control mode according to the result of the field determination process. Specifically, when it is determined that the vehicle 1 travels in the normal field, the mode selection unit 113 selects the first mode (flat mode). On the other hand, when it is determined that the vehicle 1 travels in the specific field, the mode selection unit 113 selects the second mode (off-road mode). The target path calculation unit 112 executes the target path calculation process in the selected mode (see FIG. 14).

Next, mode transition from the first mode to the second mode will be considered. When the result of the field determination process switches from the "normal field" to the "specific field" while the first mode is selected, the mode selection unit 113 switches the control mode from the first mode to the second mode. Here, patterns in which the result of the field determination process is the specific field include two types, Pattern 3 and Pattern 4 described above. The mode selection unit 113 may use a different mode transition method for each of Pattern 3 and Pattern 4.

Figure 17:
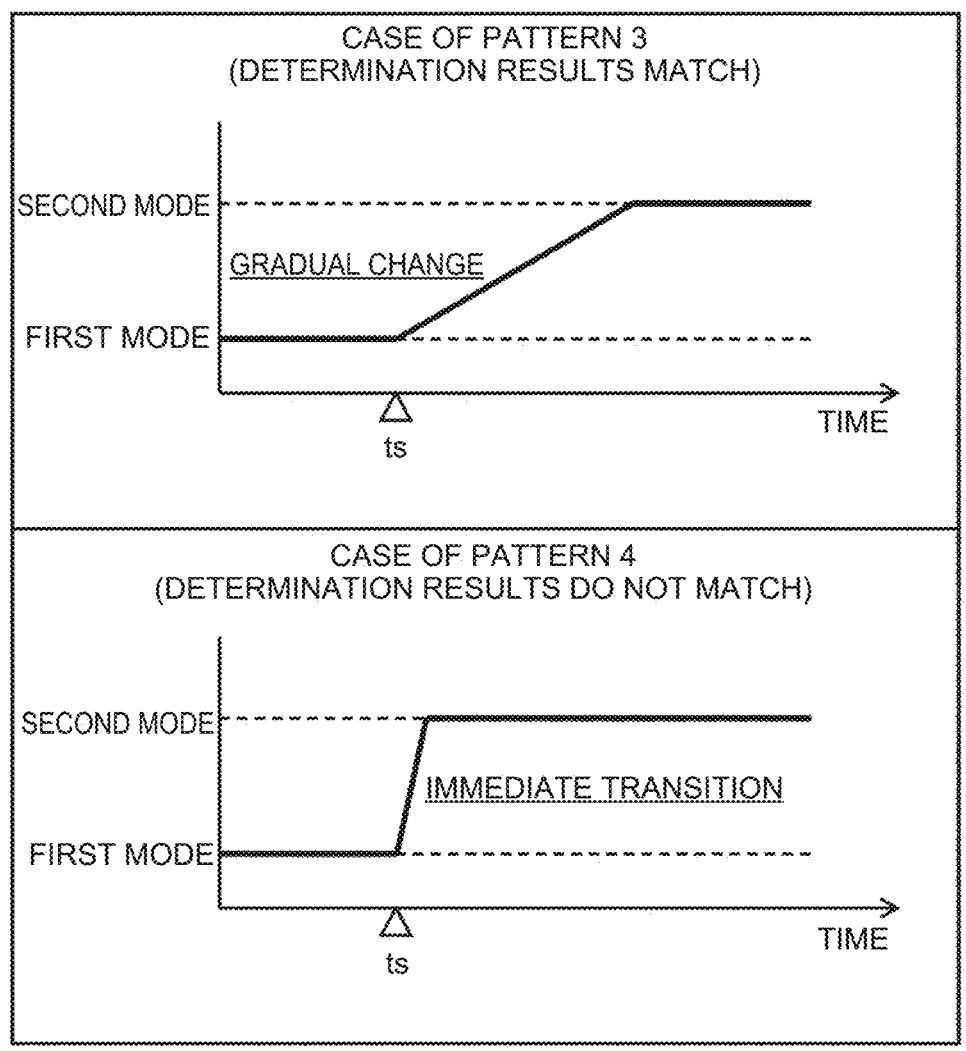
FIG. 17 is a conceptual view for describing an example of mode transition according to the embodiment of this disclosure.

FIG. 17 is a conceptual view for describing an example of mode transition from the first mode to the second mode. At time ts while the first mode is selected, the result of the field determination process switches from the "normal field" to the "specific field." In the case of Pattern 3, both determination results match. In this case, the mode selection unit 113 gradually changes the control mode from the first mode to the second mode. For example, the mode selection unit 113 gradually changes the control mode from the first mode to the second mode according to the remaining distance to the obstacle. In this case, the target path calculation unit 112 gradually increases the update period of the sub-global path PS from the default update period TS-1 to the adjusted update period TS-2. In other words, the target path calculation unit 112 gradually reduces the frequency of update of the sub-global path PS.

In the case of Pattern 4, both determination results do not match. In this case, the mode selection unit 113 immediately changes the control mode from the first mode to the second mode. In this case, the target path calculation unit 112 quickly increases the update period of the sub-global path PS from the default update period TS-1 to the adjusted update period TS-2. In other words, the target path calculation unit 112 quickly reduces the frequency of update of the sub-global path PS. Thus, the local path PL becomes quickly stable.

4-4. Effects

According to this embodiment, it is possible to calculate, in real time, a target path PT for moving to a destination while avoiding risks even in a situation where a GNSS cannot be used. Moreover, it is possible to reduce hunting of the target path PT and stabilize the target path PT even in an environment where there are many risks. As the target path PT becomes stable, stability of the vehicle 1 following the target path PT is secured, and also straying of the vehicle 1 is reduced. As straying of the vehicle 1 is reduced, the moving time or fuel consumption is kept from increasing unnecessarily. These are favorable from the viewpoint of satisfaction of the user of the vehicle 1.

5. Application to Lunar Surface Exploration and Planetary Exploration

Recently, space development projects, including international ones, have been on the rise. The technique according to the embodiment is also applicable to exploration vehicles (rovers) for exploring the lunar surface or planets.

For example, the following three issues are likely to arise in lunar surface exploration:

1. The lunar surface is an uneven road surface covered with sand gravel called regolith and having many bumps and dips, such as craters, which makes steering difficult.

2. As the outer space is a hostile environment for people to perform activities, it is necessary to select an optimal path with the limited moving time and fuel taken into consideration.

3. Burden on astronauts is expected to increase as the operation time becomes prolonged.

According to this embodiment, it is possible to calculate, in real time, a target path PT for moving to a destination while avoiding risks even on the lunar surface where a GNSS cannot be used. Moreover, it is possible to reduce hunting of the target path PT and stabilize the target path PT even in an environment where there are many risks. As a result, stability of the exploration vehicle is secured, and also straying of the exploration vehicle is reduced. As straying of the exploration vehicle is reduced, the moving time or fuel consumption is kept from increasing unnecessarily. These are favorable from the viewpoint of improving the safety of and reducing the burden on astronauts who perform activities in a harsh environment.

What is claimed is:

1. A mobile body control method, comprising:
   based on a recognition result of a recognition sensor installed in a mobile body, calculating a first target path for moving to a destination while avoiding a risk around the mobile body;
   based on the first target path, calculating a second target path having higher granularity than the first target path;
   controlling the mobile body so as to follow the second target path;
   determining in which field the mobile body moves, a normal field or a specific field having more risks than the normal field; and
   reducing a frequency of update of the first target path in the specific field compared with that in the normal field.

2. The mobile body control method according to claim 1, wherein:
   the first target path is a target path that lies in a first range ahead of the mobile body; and
   the second target path is a target path that lies in a second range ahead of the mobile body and is shorter than the first target path.

3. The mobile body control method according to claim 1, wherein reducing the frequency of update of the first target path in the specific field includes stopping updating the first target path in a predetermined range after once calculating the first target path in the predetermined range.

4. The mobile body control method according to claim 1, further comprising increasing a frequency of update of the second target path in the specific field compared with that in the normal field.

5. The mobile body control method according to claim 1, further comprising:
   when it is determined that the mobile body moves in the normal field, selecting a first mode in which the first target path is calculated once every first update period; and
   when it is determined that the mobile body moves in the specific field, selecting a second mode in which the frequency of update of the first target path is reduced compared with that in the first mode.

6. The mobile body control method according to claim 1, wherein determining a field is determining in which of the normal field and the specific field the mobile body moves, and is performed based on at least either the recognition result of the recognition sensor or map information on an area where the mobile body moves.

7. The mobile body control method according to claim 6, wherein:
   determining the field is performed based on both the recognition result of the recognition sensor and the map information; and
   determining the field comprises:
      determining that the mobile body moves in the normal field when it is determined that the mobile body moves in the normal field from at least the recognition result of the recognition sensor; and
      determining that the mobile body moves in the specific field when it is determined that the mobile body moves in the specific field from at least the recognition result of the recognition sensor.

8. The mobile body control method according to claim 6, wherein:
   determining the field is performed based on both the recognition result of the recognition sensor and the map information; and
   determining the field comprises:
      a first determination process of determining that the mobile body moves in the specific field when it is determined that the mobile body moves in the specific field from both the map information and the recognition result of the recognition sensor; and
      a second determination process of determining that the mobile body moves in the specific field when it is determined that the mobile body moves in the normal field from the map information while it is determined that the mobile body moves in the specific field from the recognition result of the recognition sensor.

9. The mobile body control method according to claim 8, further comprising reducing the frequency of update of the first target path more slowly in the first determination process than in the second determination process.

10. The mobile body control method according to claim 1, wherein:
   the risk is recognized by the recognition sensor;
   calculating the first target path includes calculating the first target path such that a first evaluation value becomes smallest;
   the first evaluation value is a value that becomes smaller as a deviation between a predetermined path to the destination and the first target path becomes smaller, and also becomes smaller as a risk value on the first target path becomes smaller; and
   the risk value is a value that becomes smaller as a distance from the risk increases.

11. The mobile body control method according to claim 1, wherein:
   calculating the second target path includes calculating the second target path such that a second evaluation value becomes smallest;
   the second evaluation value is a value that becomes smaller as a deviation between the first target path and the second target path becomes smaller, and also becomes smaller as a difference between a current yaw rate and a target yaw rate becomes smaller; and
   the target yaw rate is a yaw rate required for the mobile body to follow the second target path.

12. A mobile body control system that controls a mobile body, the mobile body control system comprising one or more processors, wherein the one or more processors are configured to execute:
   based on a recognition result of a recognition sensor installed in a mobile body, calculating a first target path for moving to a destination while avoiding a risk around the mobile body;
   based on the first target path, calculating a second target path having higher granularity than the first target path;
   controlling the mobile body so as to follow the second target path;
   determining in which field the mobile body moves, a normal field or a specific field having more risks than the normal field; and
   reducing a frequency of update of the first target path in the specific field compared with that in the normal field.

13. A non-transitory storage medium storing instructions that are executable by one or more processors and that cause the one or more processors to perform functions comprising:
   based on a recognition result of a recognition sensor installed in a mobile body, calculating a first target path for moving to a destination while avoiding a risk around the mobile body;
   based on the first target path, calculating a second target path having higher granularity than the first target path;
   controlling the mobile body so as to follow the second target path;
   determining in which field the mobile body moves, a normal field or a specific field having more risks than the normal field; and
   reducing a frequency of update of the first target path in the specific field compared with that in the normal field.

* * * * *

UNITED STATES PATENT AND TRADEMARK OFFICE
CERTIFICATE OF CORRECTION

| | | |
|---|---|---|
| PATENT NO. | : 12,365,334 B2 | Page 1 of 1 |
| APPLICATION NO. | : 18/151474 | |
| DATED | : July 22, 2025 | |
| INVENTOR(S) | : Iwai et al. | |

It is certified that error appears in the above-identified patent and that said Letters Patent is hereby corrected as shown below:

On the Title Page

Item (73) Assignee, Please change "NATIONAL UNIVERSITY ORPORATION TOKYO UNIVERSITY OF AGRICULTURE AND TECHNOLOGY" to --NATIONAL UNIVERSITY CORPORATION TOKYO UNIVERSITY OF AGRICULTURE AND TECHNOLOGY--.

Signed and Sealed this
Eleventh Day of November, 2025

John A. Squires
*Director of the United States Patent and Trademark Office*